US009374182B2

(12) United States Patent
Lee

(10) Patent No.: US 9,374,182 B2
(45) Date of Patent: Jun. 21, 2016

(54) VEHICLE AND METHOD FOR CONTROLLING THE SAME

(71) Applicant: Hyundai Motor Company, Seoul (KR)

(72) Inventor: Jin Woo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/728,346

(22) Filed: Jun. 2, 2015

(65) Prior Publication Data

US 2016/0119068 A1    Apr. 28, 2016

(30) Foreign Application Priority Data

Oct. 22, 2014  (KR) .......................... 10-2014-0143483

(51) Int. Cl.
*H04H 40/18* (2008.01)
*H04H 60/13* (2008.01)
*H04L 27/14* (2006.01)

(52) U.S. Cl.
CPC ............... *H04H 60/13* (2013.01); *H04H 40/18* (2013.01); *H04L 27/14* (2013.01)

(58) Field of Classification Search
CPC .... H04L 27/14; H04H 40/18; H04H 2201/10; H04H 2201/20; H04H 60/00; H04H 60/02; H04H 60/06; H04H 60/07; H04H 60/09; H04H 60/13; H04H 60/14; H04H 60/15; H04H 60/16
USPC .......................................................... 375/324
See application file for complete search history.

(56) References Cited

U.S. PATENT DOCUMENTS

| 5,584,051 | A  | * | 12/1996 | Goken    | H04H 20/22 340/7.43 |
| 8,612,539 | B1 | * | 12/2013 | Prager   | G11B 27/034 709/217 |
| 2008/0187153 | A1 | * | 8/2008  | Lin      | G10L 19/008 381/94.7 |
| 2015/0248890 | A1 | * | 9/2015  | Whitecar | H04H 60/12 704/500 |

FOREIGN PATENT DOCUMENTS

JP    2003069437 A    3/2003
JP    2012-254788 A   12/2012

(Continued)

OTHER PUBLICATIONS

Tanaka (EP 1133089 A2), Broadcast receiver, published on Sep. 12, 2001.*

*Primary Examiner* — Siu Lee
(74) *Attorney, Agent, or Firm* — Mintz Levin Cohn Ferris Glovsky and Popeo, P.C.; Peter F. Corless

(57) ABSTRACT

A vehicle and a method for controlling the same are provided. In particular, linking information of a broadcast signal having been output during a turn-off mode is transmitted to a DAB receiver upon receiving a turn-on signal. The vehicle includes a Digital Audio Broadcasting (DAB) receiver that is configured to receive a first DAB signal that corresponds to a selected first broadcast signal. In addition, a speaker outputs the first broadcast signal based on the received first DAB signal or a first frequency-modulation (FM) signal corresponding to the first broadcast signal. In response to receiving a turn-on signal, a controller transmits linking information of the first broadcast signal from among linking information of a plurality of broadcast signals to the DAB receiver to output the first broadcast signal output during a turn-off mode.

24 Claims, 13 Drawing Sheets

(56) References Cited

FOREIGN PATENT DOCUMENTS

| KR | 10-2002-0015478 A | 2/2002 |
|---|---|---|
| KR | 10-2006-0130163 A | 12/2006 |
| KR | 2007-0009811 A | 1/2007 |
| KR | 2013-0090712 A | 8/2013 |
| KR | 2013-0096206 A | 8/2013 |
| KR | 10-2014-0106722 A | 9/2014 |

* cited by examiner

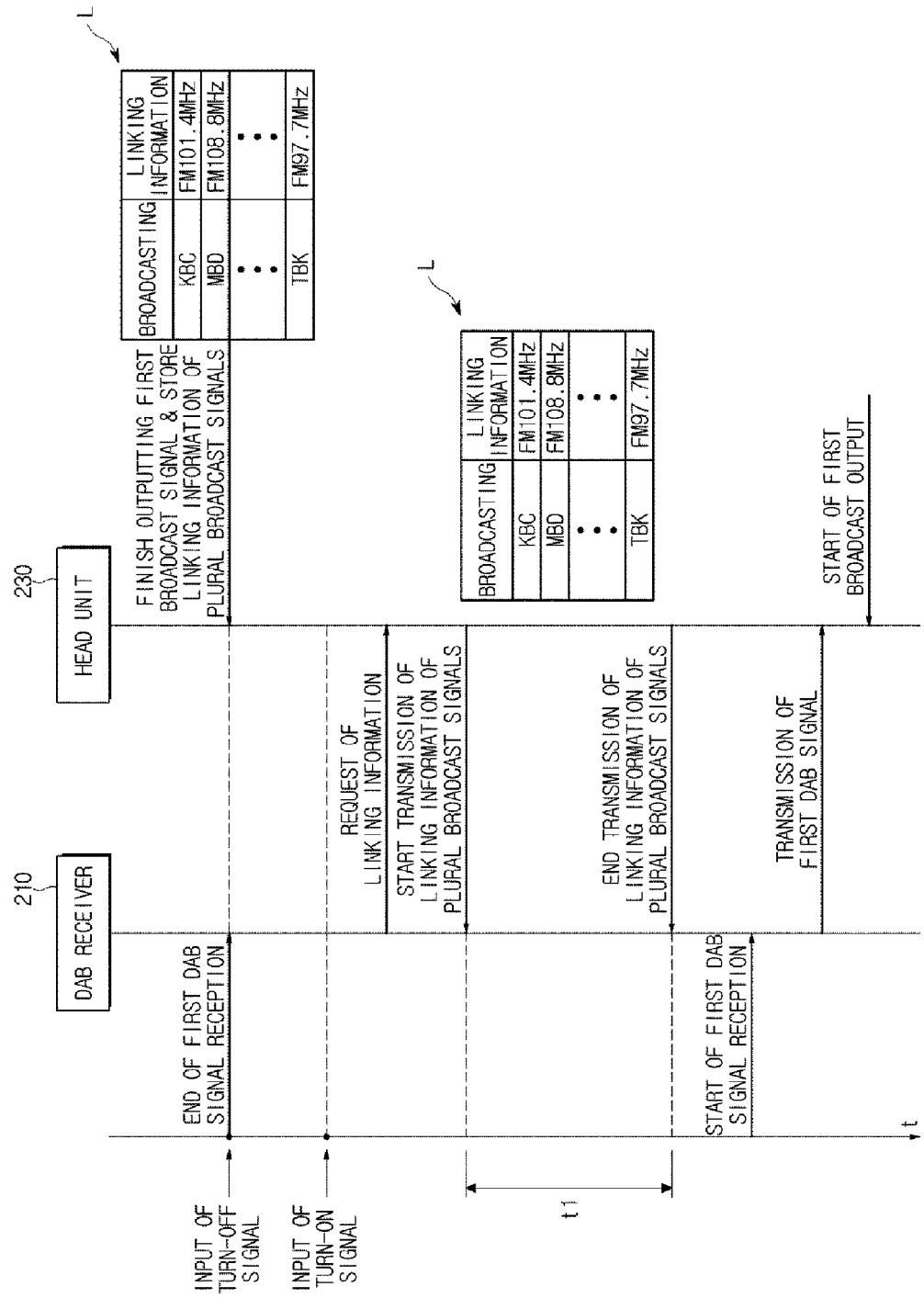

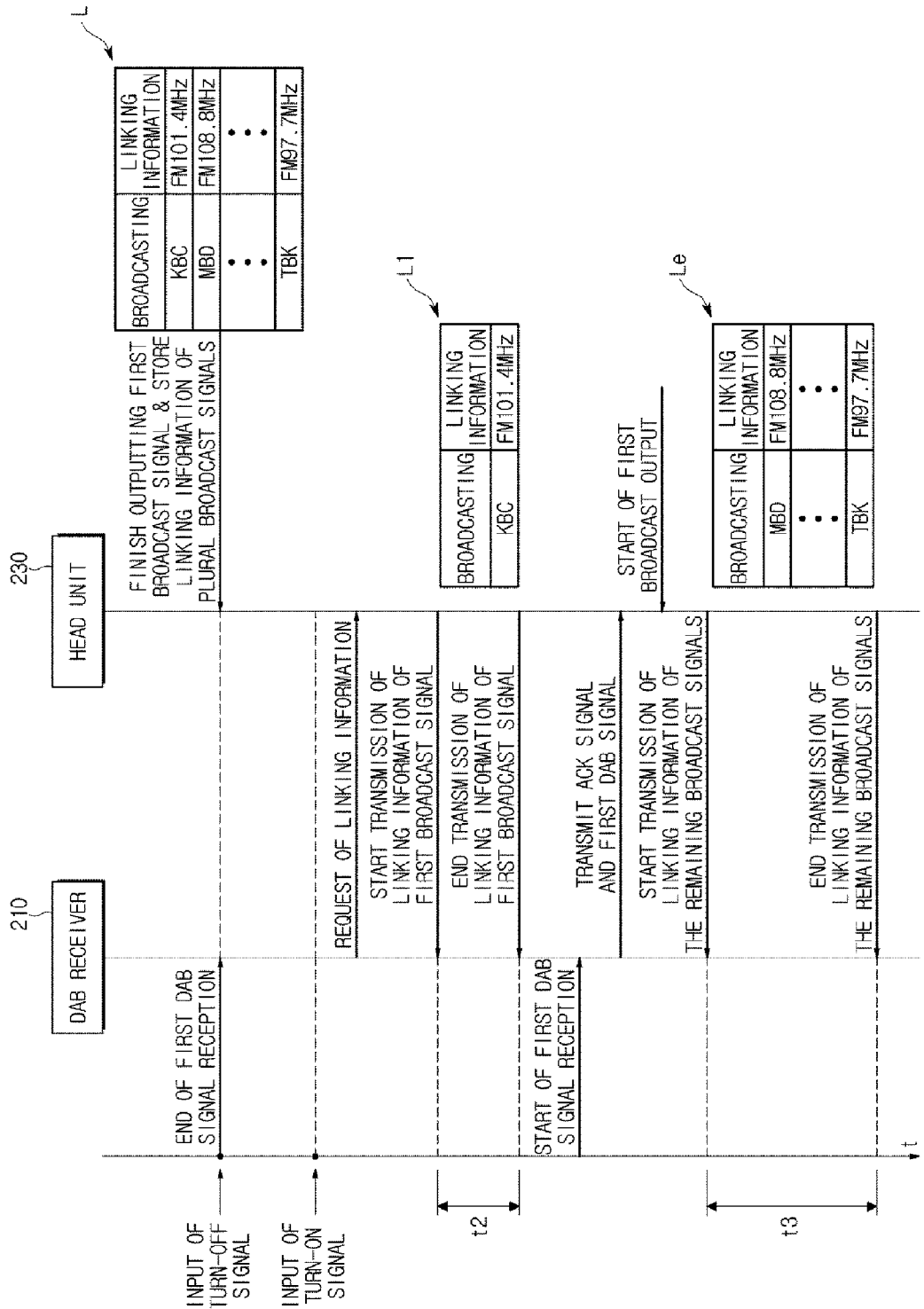

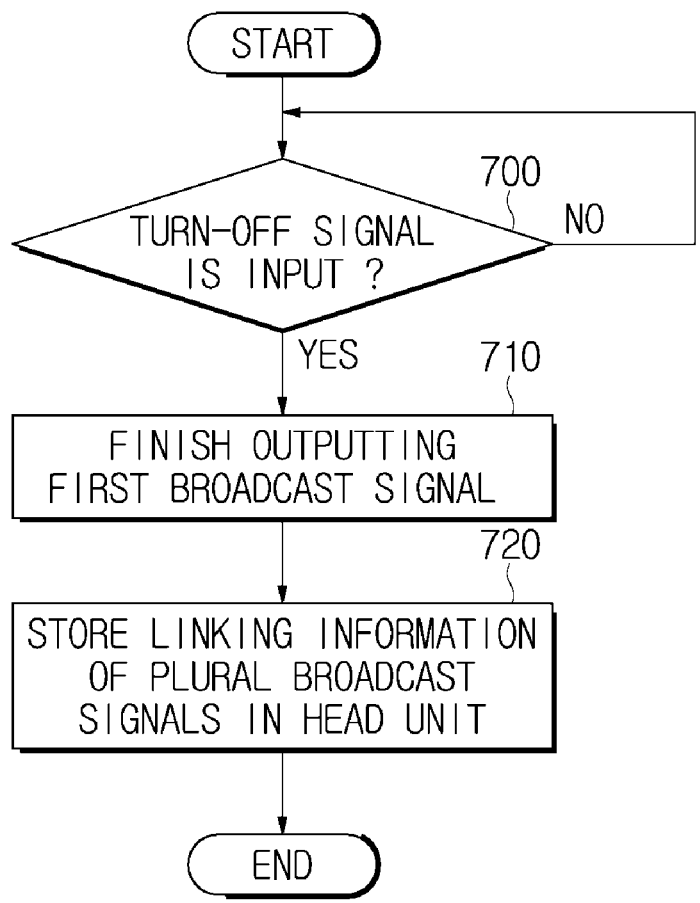

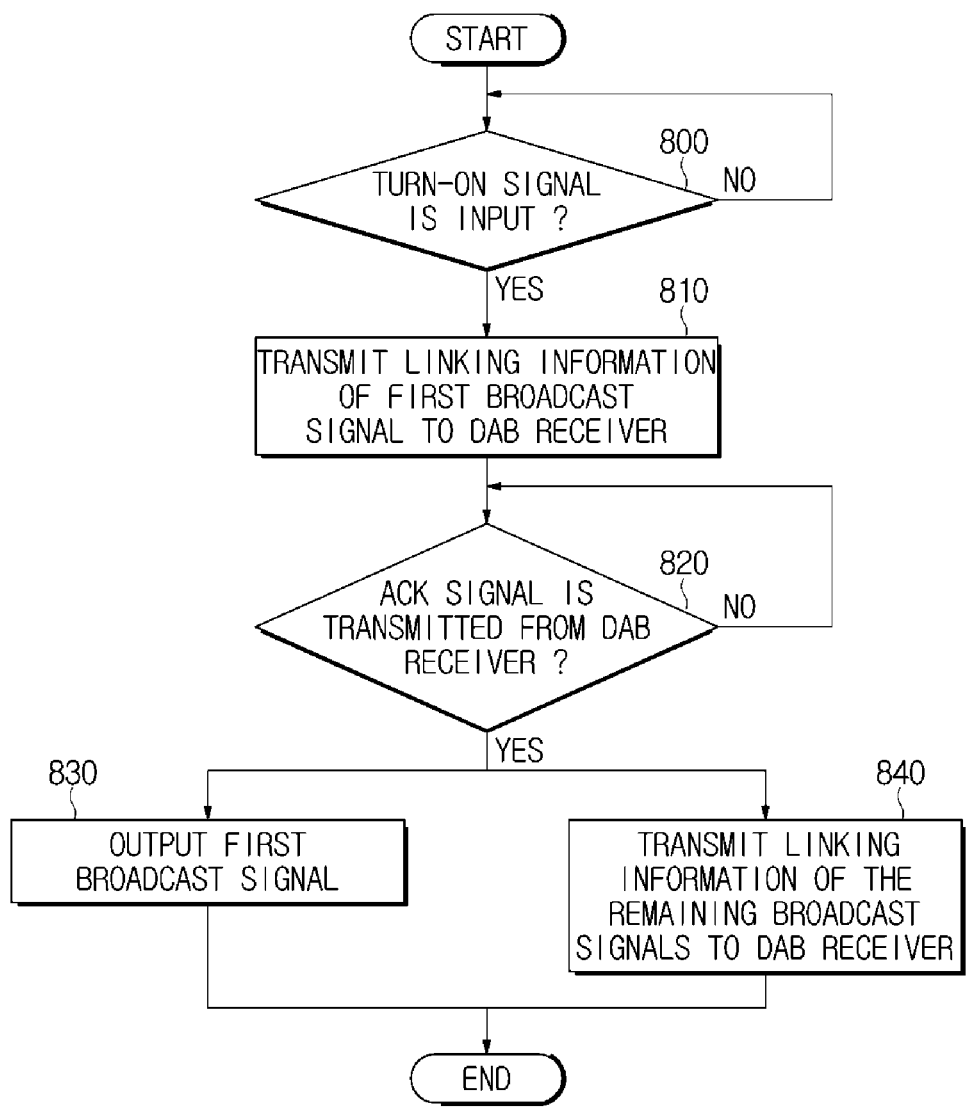

US 9,374,182 B2

VEHICLE AND METHOD FOR CONTROLLING THE SAME

CROSS-REFERENCE TO RELATED APPLICATION(S)

This application claims the benefit of Korean Patent Application No. 2014-0143483, filed on Oct. 22, 2014, in the Korean Intellectual Property Office, the disclosure of which is incorporated herein by reference.

BACKGROUND

1. Field of the Invention

The present invention relates to a vehicle having a digital audio broadcasting (DAB) receiver configured to receive a DAB signal, and a method for controlling the same.

2. Description of the Related Art

In general, a vehicle travels on roads or tracks from place to place. Vehicles may move in one direction based on rotation of at least one wheel. Such vehicles may include, for example, a three-wheeled or four-wheeled vehicle, a two-wheeled vehicle such as a motorcycle, a motorized bicycle, construction equipment, a bicycle, a train traveling on rails, and the like.

Generally, a vehicle may include an audio device for outputting audio signals. The audio device installed within the vehicle may be configured to receive and output audio broadcast signals, and may further include a tape player function, a compact disc (CD) player function, an MP3 player function, etc., to output a variety of multimedia data. In addition, the audio device for vehicles (hereinafter referred to as a vehicle audio device) has gradually evolved into an improved audio device that receives a high-quality audio broadcast signal. For example, the vehicle audio device may be designed to receive and output a digital audio broadcasting (DAB) signal. In particular, digital audio broadcasting (DAB) may refer to high-quality broadcasting, and may include audio signals, texts, graphics, and moving images.

SUMMARY

Various exemplary embodiments of the present invention are directed to providing a vehicle and a method for controlling the same that substantially obviate one or more problems due to limitations and disadvantages of the related art. Therefore, it is an aspect of the present invention to provide a vehicle and a method for controlling the same in which linking information of a broadcast signal being output during a turn-off mode is transmitted to a DAB receiver during a turn-on mode. Additional aspects of the invention will be set forth in part in the description which follows and, in part, will be obvious from the description, or may be learned by practice of the invention.

In accordance with one aspect of the present invention, a vehicle may include: a Digital Audio Broadcasting (DAB) receiver configured to receive a first DAB signal that corresponds to a first broadcast signal selected by a user; a speaker configured to output the first broadcast signal based on the received first DAB signal or a first frequency-modulation (FM) signal that corresponds to the first broadcast signal; and a head unit, upon receiving a turn-on signal, configured to transmit linking information of the first broadcast signal from among linking information of a plurality of broadcast signals to the DAB receiver to output the first broadcast signal that has been output during a turn-off mode.

After receiving the linking information of the first broadcast signal from the head unit, the DAB receiver may be configured to transmit an acknowledgement (ACK) signal to the head unit. After receiving the acknowledgement (ACK) signal from the DAB receiver, the head unit may be configured to transmit linking information of the remaining broadcast signals other than the first broadcast signal to the DAB receiver. When a second broadcast signal is selected during transmission of the linking information of the remaining broadcast signals other than the first broadcast signal, the head unit may be configured to determine transmission or non-transmission of linking information of the second broadcast signal. In response to determining that the linking information of the second broadcast signal is not transmitted to the DAB receiver, the head unit may first be configured to transmit the linking information of the second broadcast signal from among the remaining broadcast signals other than the first broadcast signal.

The linking information may include frequency-modulation (FM) frequency information for receiving an FM signal used to output a corresponding broadcast signal. When intensity of the received first DAB signal is equal to or less than a predetermined threshold value, the DAB receiver may be configured to confirm a first FM frequency from the linking information of the first broadcast signal.

The vehicle may further include: a frequency-modulation (FM) receiver configured to receive the first FM signal that corresponds to the first broadcast signal through the confirmed first FM frequency. The head unit may be configured to operate the speaker to output the first broadcast signal based on the first FM signal received by the FM receiver. The head unit may include a head-unit storage unit configured to store linking information of the plurality of broadcast signals upon receiving the turn-off signal.

The head-unit storage unit may further be configured to store linking information of the plurality of broadcast signals including the first broadcast signal. The head unit may further include a controller configured to transmit linking information of the first broadcast signal output during the turn-off mode from among the linking information of the plurality of broadcast signals stored in the head-unit storage unit to the DAB receiver, upon receiving the turn-on signal.

In accordance with another aspect of the present invention, a method for controlling a vehicle that includes a Digital Audio Broadcasting (DAB) receiver configured to receive a first DAB signal that corresponds to a first broadcast signal selected by a user may include stopping, by a controller, the output of the first broadcast signal in response to receiving a turn off signal; transmitting, by the controller, linking information of the first broadcast signal from among linking information of a plurality of broadcast signals to the DAB receiver in response to receiving a turn on signal; and outputting the first broadcast signal using the first DAB signal or a first frequency-modulation (FM) signal obtained based on the linking information of the first broadcast signal.

The method may further include: in response to receiving the linking information of the first broadcast signal stored in a head unit from the DAB receiver, transmitting, by the controller, an acknowledgement (ACK) signal to the head unit. The method may further include: in response to receiving the acknowledgement (ACK) signal from the head unit, transmitting, by the controller, linking information of the remaining broadcast signals other than the first broadcast signal to the DAB receiver.

The operation of transmitting the linking information of the remaining broadcast signals other than the first broadcast signal to the DAB receiver may include when a second broadcast signal is selected while the linking information of the remaining broadcast signals other than the first broadcast signal is transmitted to the DAB receiver, determining whether linking information of the second broadcast signal is transmitted to the DAB receiver. In addition, the operation of transmitting the linking information of the remaining broadcast signals other than the first broadcast signal to the DAB receiver may include: in response to determining that the linking information of the second broadcast signal is not transmitted to the DAB receiver, first transmitting the linking information of the second broadcast signal from among the remaining broadcast signals other than the first broadcast signal.

The information linking may include frequency-modulation (FM) frequency information for receiving an FM signal used to output a corresponding broadcast signal. The operation for outputting the first broadcast signal may include: selecting any one of the first DAB signal and the first FM signal in response to intensity of the first DAB signal. Further, the operation for outputting the first broadcast signal may include: when the intensity of the received first DAB signal is equal to or less than a predetermined threshold value, confirming, by the controller, a first FM frequency based on the linking information of the first broadcast signal.

The operation for outputting the first broadcast signal may further include: receiving a first frequency-modulation (FM) signal that corresponds to the first broadcast signal using the confirmed first FM frequency. The operation for outputting the first broadcast signal may further include: outputting the first broadcast signal based on first FM frequency. The method may further include: upon receiving the turn-off signal, storing, by the controller, the linking information of the plurality of broadcast signals in a head unit. Additionally, the operation for storing the linking information of the plurality of broadcast signals may include: storing, by the controller, linking information of the plurality of broadcast signals including the first broadcast signal in the head unit.

BRIEF DESCRIPTION OF THE DRAWINGS

These and/or other aspects of the invention will become apparent and more readily appreciated from the following description of the exemplary embodiments, taken in conjunction with the accompanying drawings of which:

FIGS. 9A and 9B are exemplary flowcharts illustrating the operations of a DAB receiver and a head unit according to lapse of time according to an exemplary embodiment of the present invention;

FIG. 10 is an exemplary flowchart illustrating the operations activated when a turn-off signal is input to a vehicle according to an exemplary embodiment of a vehicle control method; and FIG. 11 is an exemplary flowchart illustrating the operations activated when a turn-on signal is input to a vehicle according to an exemplary embodiment of a vehicle control method.

DETAILED DESCRIPTION

Figure 1:
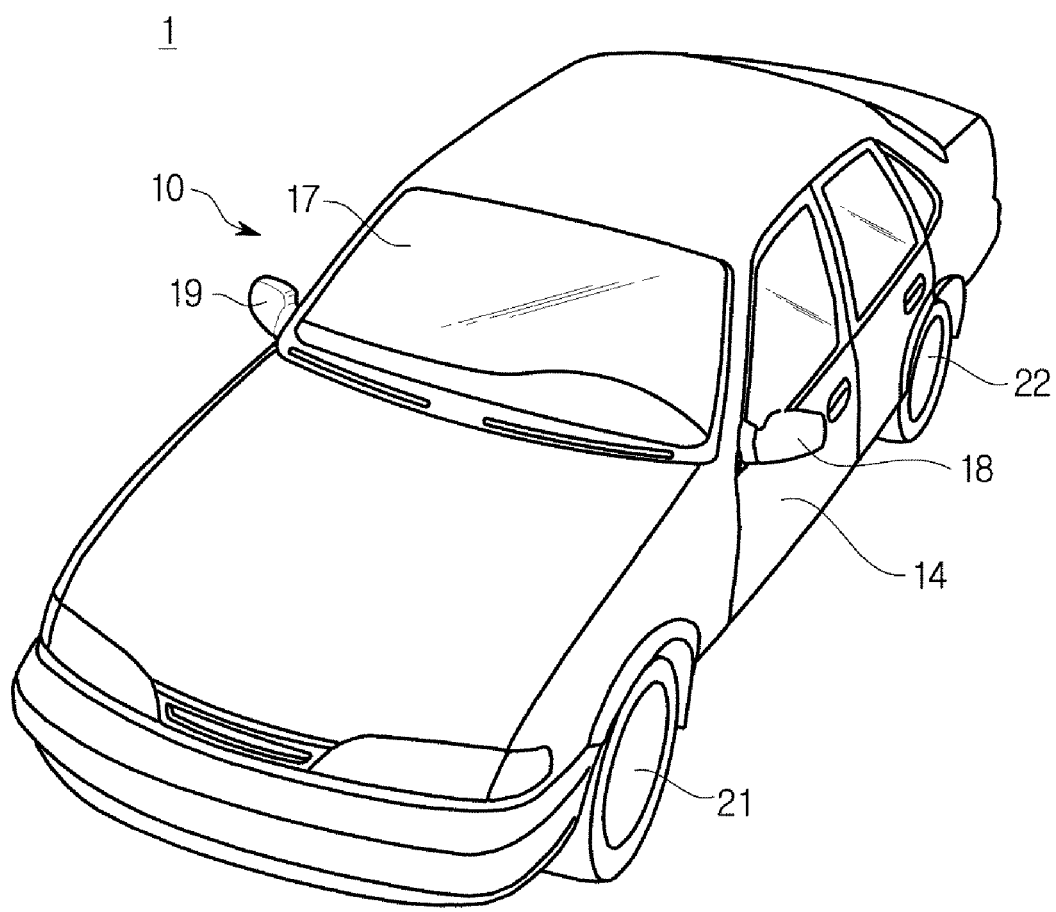
FIG. 1 is an exemplary view illustrating the appearance of a vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings, wherein like reference numerals refer to like elements throughout. A vehicle and a method for controlling the same according to the exemplary embodiments will hereinafter be described with reference to the attached drawings.

FIG. 1 is an exemplary view illustrating the appearance of a vehicle according to an exemplary embodiment of the present invention. Referring to FIG. 1, the vehicle 1 may include a main body 10 that forms the appearance of the vehicle 1, a plurality of vehicle wheels (21, 22) configured to move the vehicle 1, a drive unit (not shown) configured to rotate the vehicle wheels (21, 22), doors 14 configured to shield an indoor space of the vehicle 1 from the exterior, a vehicle windshield 17 configured to provide a forward view of the vehicle 1 to a vehicle driver within the vehicle 1, and side-view mirrors (18, 19) configured to provide a backward view of the vehicle 1 to the vehicle driver.

The wheels (21, 22) may include front wheels 21 disposed at the front of the vehicle and rear wheels 22 disposed at the rear of the vehicle. The drive unit (not shown) may be configured to provide rotational force to the front wheels 21 or the rear wheels 22 to cause the main body 10 to move forward or backward. The drive unit (not shown) may include an engine configured to generate rotational force by burning fossil fuels or a motor configured to generate rotational force upon receiving a power source from a condenser (not shown).

The doors 14 may be disposed rotatably at the right and left sides of the main body 10 to shield an indoor space of the vehicle 1 from the exterior when the doors 14 are closed. The windshield 17 may be disposed at a front upper portion of the main body 10 to provide a driver with a visual view of a forward direction of the vehicle 1. The windshield 17 may also be referred to as a windshield glass.

The side-view mirrors (18, 19) may include a left side-view mirror 18 disposed at the left of the main body 1 and a right side-view mirror 19 disposed at the right of the main body 1, to provide the driver with visual views of the lateral and rear directions of the vehicle 1. Further, the vehicle 1 may include a variety of sensing devices, for example, a proximity sensor 510 configured to detect the presence of obstacles located at the lateral and rear directions of the vehicle 1, a rain sensor configured to detect the presence or absence of rainfall and the amount of rainfall, etc.

For example, the proximity sensor may be configured to emit a sensing signal to a lateral direction or a backward direction of the vehicle, and receive a signal reflected from obstacles such as other vehicles. In addition, the proximity sensor may be configured to detect the presence or absence of an obstacle located at the rear of the vehicle 1 based on a waveform of the received reflection signal, and may be configured to recognize the position of obstacle. The proximity sensor may be configured to emit ultrasonic waves, and may be configured to detect the distance to the obstacle using the ultrasonic waves reflected from the obstacle.

Figure 2:
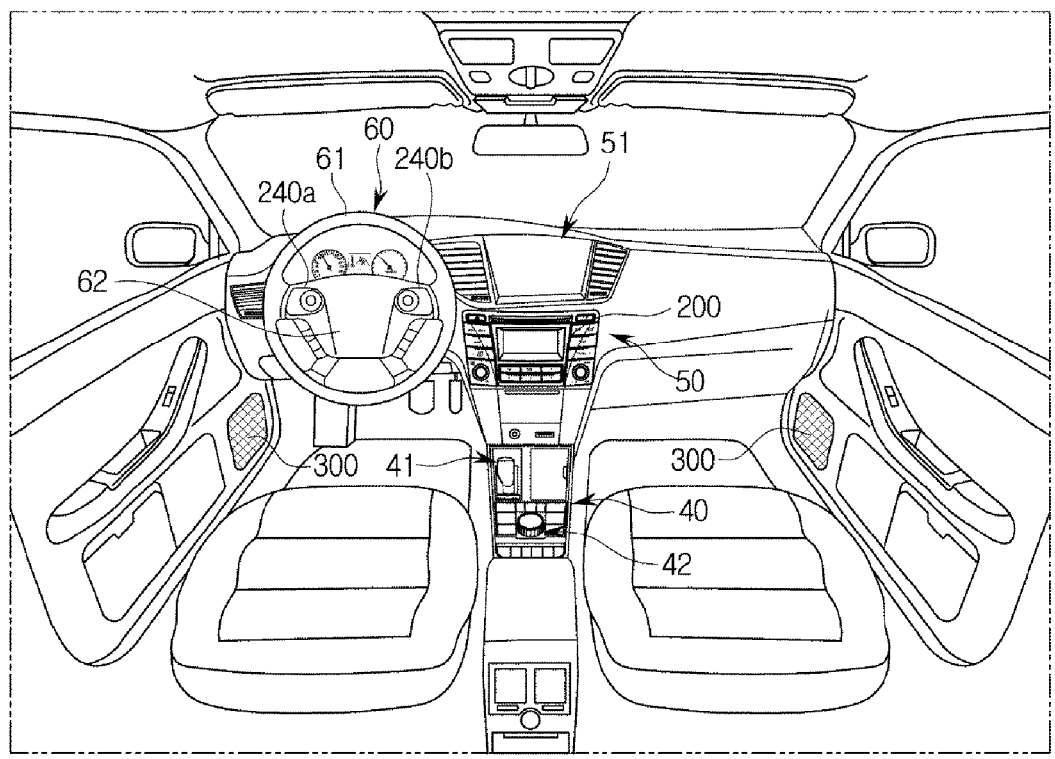
FIG. 2 is an exemplary view illustrating the internal structure of the vehicle according to an exemplary embodiment of the present invention.

FIG. 2 is an exemplary view illustrating the internal structure of the vehicle according to an exemplary embodiment of the present invention. Referring to FIG. 2, the vehicle may have a dashboard that may include a gearbox 40, a center console (also called a center fascia) 50, a steering wheel 60, etc. A gearshift 41 for vehicle gear-shifting may be installed at the gearbox 40. In addition, as seen from FIG. 2, a dial manipulation unit 42 for allowing a user to operate a navigation device 51 or the principal functions of the vehicle may be installed at the gearbox 40.

The center console 50 may include an air-conditioner, a clock, an audio device 200, a navigation device 51, a storage-medium access device coupled to a storage medium such as a Universal Serial Bus (USB), etc. The air-conditioner may be configured to maintain temperature, humidity, purity, and airflow of indoor air of the vehicle to desired conditions. The air-conditioner may be installed at the center console 50, and may include at least one air outlet through which air may be discharged to the exterior. A button or dial for adjusting the air-conditioner may be installed at the center console 50 and a user such as a vehicle driver may adjust the air-conditioner of the vehicle using the button or dial mounted to the center console.

In accordance with one exemplary embodiment, a navigation system 51 may be installed at the center console 50. The navigation 51 may be embedded in the center console of the vehicle. In addition, an input unit for operating the navigation 51 may also be installed at the center console. The input unit of the navigation system 51 may also be installed at other positions instead of the center console. For example, the input unit of the navigation system 51 may be disposed in the vicinity of the display of the navigation system 51. In another example, the input unit of the navigation system 51 may also be installed at the gearbox 40 or the like.

The steering wheel 60 is a device that adjusts a vehicle traveling direction of the vehicle, may be connected to a rim 61 grasped by a vehicle driver and a vehicle steering device, and may include a spoke 62 to connect the rim 61 to a hub of a rotation axis for steering. In accordance with one exemplary embodiment, the spoke 62 may include various devices embedded within the vehicle, for example, manipulation devices (240a, 240b) for operating the audio device, etc. In addition, the dashboard may include various instrument panels on which a vehicle traveling speed, the number of revolutions per minute (rpm) of an engine, and the remaining fuel quantity may be displayed, and may further include a glove box in which various goods or articles may be stored.

The audio device 200 may be configured to receive a broadcast signal, and output the received broadcast signal. FIG. 2 illustrates the audio device 200 disposed at the center console. In particular, the speaker 230 configured to receive the broadcast signal from the audio device and output the broadcast signal may be installed at the front door of the vehicle. However, FIG. 2 shows the installation position of a speaker, and it should be noted that the speaker may also be installed at any location within the vehicle.

Figure 3:
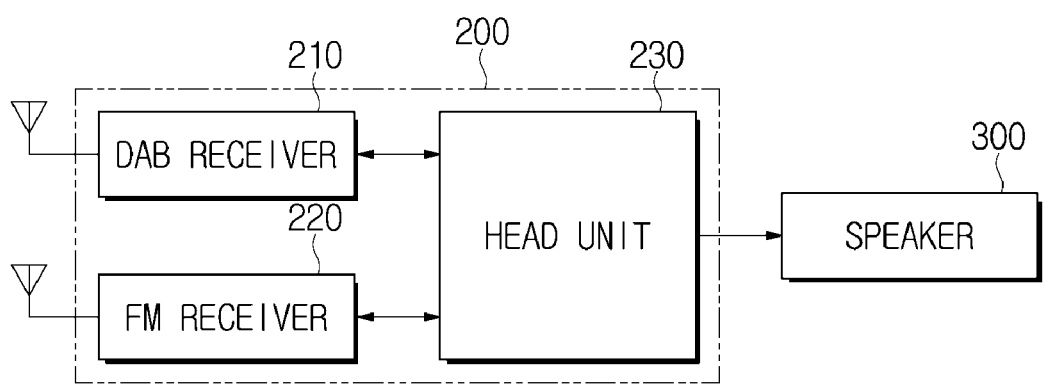
FIG. 3 is an exemplary block diagram illustrating a vehicle according to an exemplary embodiment of the present invention.

The constituent elements and operations of the above-mentioned audio device 200 will hereinafter be described in detail. FIG. 3 is an exemplary block diagram illustrating a vehicle according to an exemplary embodiment of the present invention. In particular, a vehicle may include a Digital Audio Broadcasting (DAB) receiver 210 configured to receive a DAB signal, a frequency-modulation (FM) receiver 220 configured to receive an FM signal, a head unit 230 configured to process the DAB signal and the FM signal, and a speaker configured to output broadcast signals based on the processed signals.

A broadcast output process of a vehicle according to the exemplary embodiment shown in FIG. 3 will hereinafter be described in detail. Referring to FIG. 3, the DAB receiver 210 and/or the FM receiver 220 may be configured to receive a broadcast signal. In particular, the DAB receiver 210 may be configured to receive the DAB signal, and the FM receiver 220 may be configured to receive the FM signal.

In particular, the DAB signal may refer to a broadcast signal through which multiple audio streams that have been created by different broadcast enterprises using the multiplexing and compression technology, are transmitted through one broadcast frequency called a DAB ensemble. Respective broadcast enterprises may be assigned different bit rates. In addition, the FM signal may refer to a broadcast signal transmitted using frequency modulation. In this instance, respective broadcast enterprises may be assigned different modulation frequencies.

Figure 4:
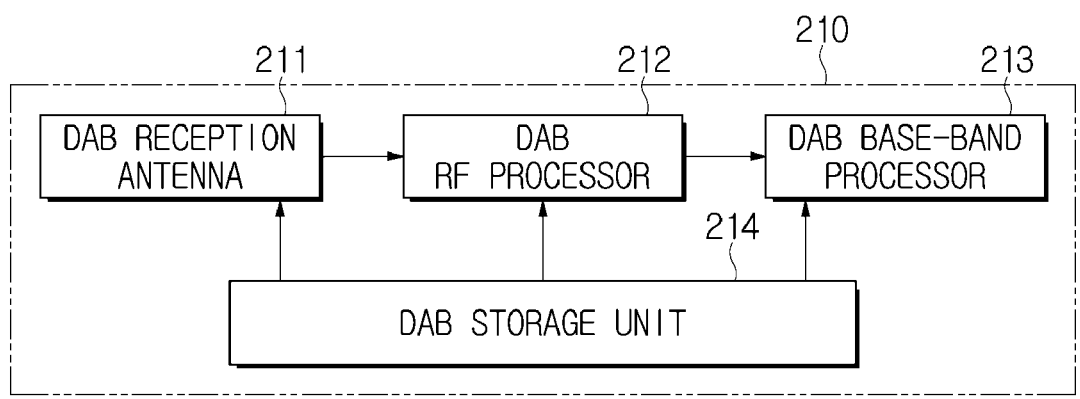
FIG. 4 is an exemplary block diagram illustrating a DAB receiver of a vehicle according to an exemplary embodiment of the present invention.

A method for receiving a broadcast signal will hereinafter be described with reference to FIGS. 4 and 5. FIG. 4 is an exemplary block diagram illustrating a DAB receiver of a vehicle according to an exemplary embodiment of the present invention. A method for allowing the DAB receiver 210 to receive the DAB signal acting as an exemplary broadcast signal will hereinafter be described with reference to FIG. 4.

The DAB receiver 210 may be configured to receive the DAB signal and perform pre-processing of the DAB signal. For this purpose, the DAB receiver 210 for use in a vehicle according to the exemplary embodiment may include a DAB reception (Rx) antenna 211 configured to receive a DAB signal, a DAB radio frequency (RF) processor 212 configured to convert the received DAB signal into a base-band DAB signal that corresponds to a user-selected broadcasting, a DAB base-band processor 213 configured to convert the base-band DAB signal into a digital signal, and a DAB storage unit 114 configured to store data to be referenced for reception/transmission of the DAB signal.

The DAB reception antenna 211 may be configured to receive the DAB signal emitted from the broadcast enterprise. The DAB signal initially received by the DAB reception antenna 211 may be an analog radio frequency (RF) signal. The DAB RF processor 212 may be configured to receive a DAB signal received by the DAB reception antenna 211, and convert the DAB signal into a base band that corresponds to a user-selected broadcasting. In particular, the base band that corresponds to the user-selected broadcasting may refer to a frequency band selected by a broadcast enterprise which produces the corresponding broadcasting and desires to modulate carriers.

Information regarding the relationship between the broadcast signal and the base band corresponding to this broadcast signal may be stored in the DAB storage unit 214. The DAB base-band processor 213 may be configured to convert an analog signal of the converted base-band into a digital signal to perform analog-to-digital conversion (ADC). As a result, the DAB signal generated from the DAB base-band processor 213 may be a digital signal.

Figure 5:
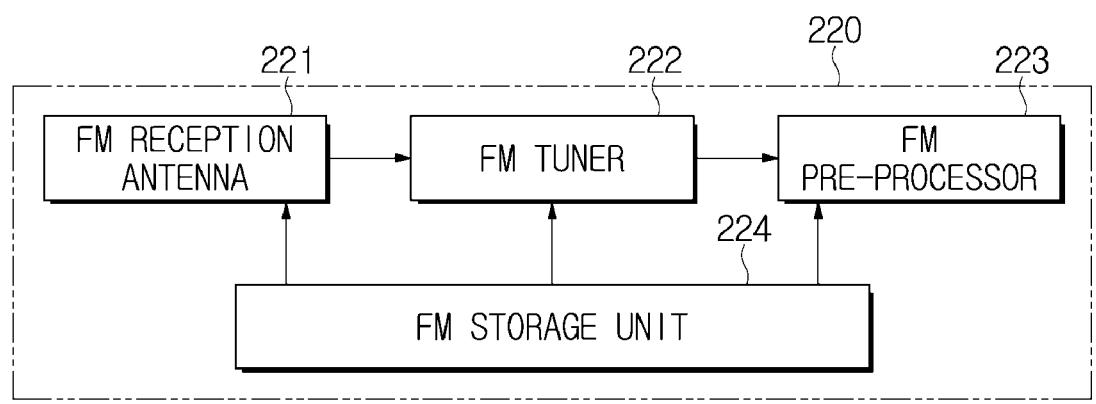
FIG. 5 is an exemplary block diagram illustrating a frequency-modulation (FM) receiver for use in a vehicle according to an exemplary embodiment of the present invention.

FIG. 5 is an exemplary block diagram illustrating the FM receiver for use in a vehicle according to an exemplary embodiment of the present invention. A method for receiving the FM signal acting as another broadcast signal by the FM receiver 220 will hereinafter be described with reference to FIG. 5. The FM receiver 220 may be configured to receive FM signals of a desired broadcast signal. Accordingly, the FM receiver 220 for use in the vehicle may include an FM reception antenna 221 configured to receive an FM signal, an FM tuner 222 configured to obtain an FM signal of a desired frequency from among FM signals received by the FM reception antenna, an FM pre-processor 223 configured to perform pre-processing of the FM signal, and an FM storage unit 224 configured to store data to be referenced for reception/transmission of the FM signal.

The FM reception antenna 221 may be configured receive the FM signal emitted from the broadcast enterprise. The FM signal initially received by the DAB reception antenna 211 may be an analog radio frequency (RF) signal. The FM tuner 222 may be configured to obtain an FM signal of a desired frequency from among FM signals received by the FM reception antenna 221. When a desired broadcast signal is selected, the FM tuner 222 may be configured to confirm a frequency that corresponds to the selected broadcast signal, and may be configured to extract the FM signal that corresponds to the confirmed frequency.

In particular, the frequency that corresponds to the broadcast signal may be predetermined when the broadcast enterprise transmits a broadcast signal, and information regarding this frequency may be stored in the FM storage unit 224. The FM pre-processor 223 may be configured to remove an echo signal of the obtained FM signal, and perform Automatic Gain Control (AGC), Automatic Volume Control (AVC), and Noise Suppression (NS). As seen from FIGS. 4 and 5, broadcast signals received via the DAB receiver 210 and/or the FM receiver 220 may be transferred to the head unit 230.

Figure 6:
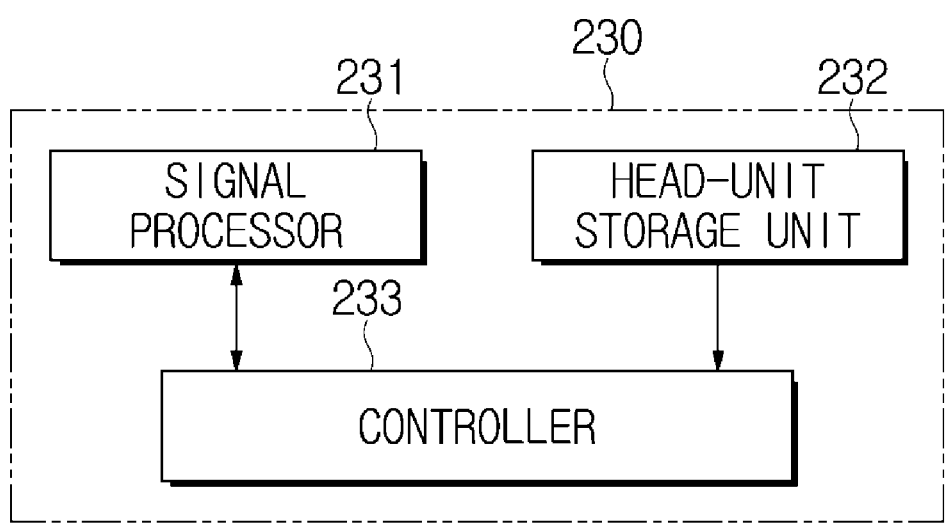
FIG. 6 is an exemplary block diagram illustrating a head unit of a vehicle according to an exemplary embodiment of the present invention.

FIG. 6 is an exemplary block diagram illustrating a head unit of a vehicle according to an exemplary embodiment of the present invention. The head unit 230 may be configured to perform post-processing of the received broadcast signal. In particular, the head unit 230 may include a signal processor 232 configured to process the broadcast signal, a head-unit storage unit 232 configured to store data to be referenced for processing of the broadcast signal, and a controller 233 configured to operate constituent elements of the head unit 230.

The controller 233 may be configured to receive the DAB signal from the DAB receiver 210, and receive the FM signal from the FM receiver 220. The controller 233 may be configured to operate the signal processor 231 to process the received broadcast signal. The signal processor 231 may be configured to process the DAB signal and/or the FM signal. In particular, the signal processor 231 may be configured to demodulate the DAB signal and/or the FM signal, and decode the demodulated signal. The controller 233 may then be configured to transmit the broadcast signal processed by the signal processor 231 to the speaker 300 of FIG. 3. The speaker 300 may be configured to convert the received broadcast signal into audible sound to output a user-selected broadcast signal.

In FIGS. 4 to 6, the DAB receiver 210 may be configured to perform pre-processing of signals, and perform the post-processing of the demodulated and decoded signal. In addition, the DAB receiver 210 and/or the FM receiver 220 may also be configured to perform demodulation and/or decoding of signals as necessary. Meanwhile, the DAB receiver 210 may be configured to link the digital audio broadcasting to the FM broadcasting. In particular, the term "link" may refer to a function for receiving the FM signal that corresponds to the same broadcasting when the DAB signal has a substantially low quality.

For example, when a first broadcast signal is selected, the DAB receiver 210 may be configured to receive a first DAB signal that corresponds to the first broadcast signal. Particularly, the DAB receiver 210 may be configured to determine whether intensity of a first DAB signal is equal to or less than a threshold value. The threshold value may be prestored in the DAB storage unit. The first DAB signal may be compared with a threshold value of any one of the DAB reception antenna 211, the DAB RF processor 212, and the DAB base-band processor 213.

When the intensity of the first DAB signal is less than the predetermined threshold value, a signal quality may be determined to be substantially low (e.g., below a predetermined quality level) and the DAB receiver 210 may be configured to determine to receive the first FM signal that corresponds to the first broadcast signal. Accordingly, the FM receiver 220 may be configured to receive the first FM signal, and the speaker 300 may be configured to output a first broadcast signal based on the first FM signal. To perform linking as shown in the above-mentioned example, the DAB receiver 210 may be configured to store linking information (L) of a plurality of broadcast signals. In particular, the DAB storage unit 214 may be configured to store linking information including frequency information of the FM signal acting as a basis of several broadcast signals.

Figure 7:
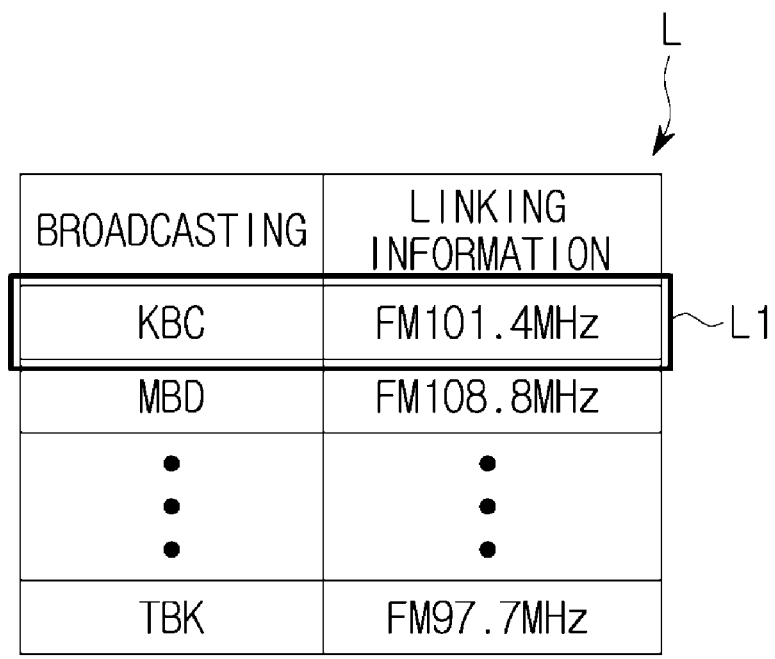
FIG. 7 illustrates an exemplary linking information table for use in a vehicle according to an exemplary embodiment of the present invention.

FIG. 7 illustrates a linking information table for use in a vehicle according to an exemplary embodiment of the present invention. Referring to FIG. 7, the linking information may be specific information matched with (e.g., correlating to) the FM frequency of each of several broadcast signal. Referring to the linking information, the FM signal of a specific FM frequency matched to output a specific broadcast signal may be received. For example, to output KBC broadcasting, the FM signal of 101.4 MHz may be received. To output MBD broadcasting, the FM signal of 108.8 MHz may be received and to output TBK broadcasting, the FM signal of 97.7 MHz may be received. This linking information may be directly stored in the DAB receiver 210 when the audio device 200 is turned on. However, when the audio device 200 is turned off, linking information may be stored in the head-unit storage unit 232 of the head unit 230, and may be deleted in the DAB receiver 210.

Therefore, when the audio device 200 is turned on, to again output the broadcast signal output when the audio device 200 is turned off, the DAB receiver 210 may be required to retrieve linking information from the head unit 230. Particularly, although linking information required for the DAB receiver 210 may be linking information of the broadcast signal output when the DAB receiver 210 is turned off, after the linking information (L) of several broadcast signals are transmitted from the head unit 230 to the DAB receiver 210, the DAB receiver 210 may be configured to reference linking information of a broadcast signal to be output. Accordingly, during a predetermined time from a turn-on time to a broadcast output time, at least a predetermined time required when the DAB receiver 210 receives linking information of the broadcast signals is required.

Referring back to FIG. 6, to address this issue, upon receiving a turn-on signal, the head unit 230 may first be configured to transmit linking information (L1) of the first broadcast signal from among a plurality of broadcast linking information (L) to the DAB receiver 210 to thus output the broadcast signal (hereinafter referred to as a first broadcast signal) output when the turn-off signal is output.

In particular, the head-unit storage unit 232 may be configured to store linking information (L) of a plurality of broadcast signals upon receiving a turn-off signal. The linking information (L) of the plurality of broadcast signals stored in the head-unit storage unit 232 may include linking information (L1) of a first broadcast signal output when the turn-off signal is received. In addition, upon receiving the turn-on signal, the controller 233 of the head unit 230 may be configured to transmit linking information (L1) of the first broadcast signal from among linking information (L) of several broadcast signals stored in the head-unit storage unit 232 to the DAB receiver 210.

Figure 8A:
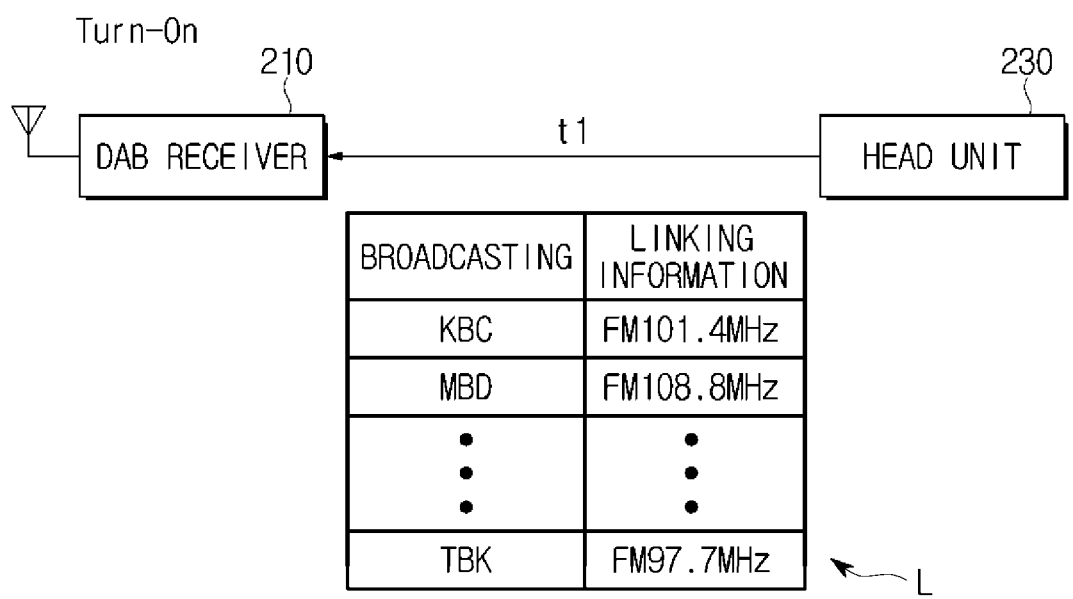
FIGS. 8A and 8B are exemplary diagrams illustrating a transmission time during which a head unit transmits linking information according to an exemplary embodiment of the present invention.
Figure 8B:
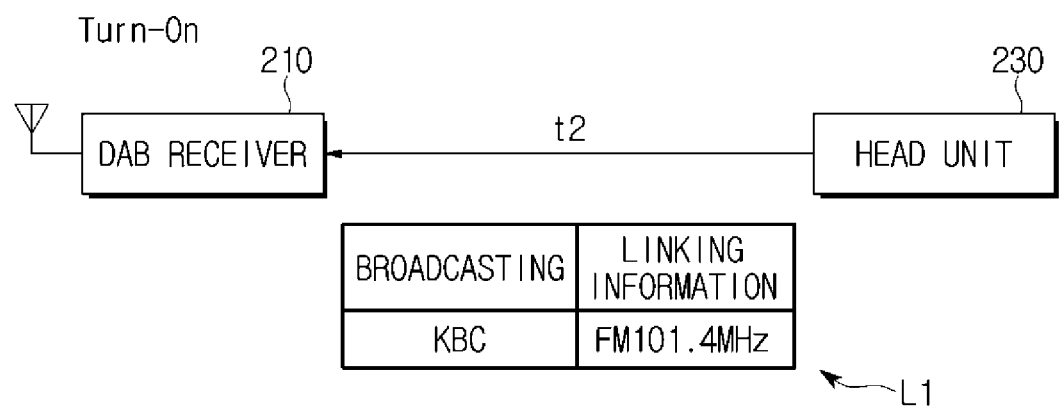

The operations of the head unit 230 will hereinafter be described with reference to FIGS. 8A, 8B, 9A, and 9B. FIGS. 8A and 8B are conceptual diagrams illustrating a transmission time during which a head unit transmits linking information. FIGS. 8A and 8B are conceptual diagrams illustrating a transmission time during which the head unit transmits linking information.

FIG. 8A exemplarily shows when the head unit 230 transmits the linking information. When the turn-on signal is input to the audio device 200, the head unit 230 may be configured to transmit linking information of the broadcast signals to the DAB receiver 210. In particular, it may be assumed that a time consumed for transmission of such linking information may be denoted by $t_1$. Accordingly, a time consumed from the turn-on time to the output time of the first broadcast signal may be equal to or greater than $t_1$.

FIG. 8B exemplarily shows when the head unit 230 transmits linking information (L1) of the first broadcast signal according to one exemplary embodiment. When the turn-on signal is input to the audio device 200, the head unit 230 may first be configured to transmit the linking information (L1) of the first broadcast signal from among linking information of the entire broadcast signals to the DAB receiver 210.

In particular, it may be assumed that a time consumed for transmission of the linking information is denoted by $t_2$. Accordingly, a time required to output the first broadcast signal from the turn-on time point may be equal to or greater than $t_2$. When a particular time ($t_2$) consumed to transmit the linking information (L1) of the first broadcast signal is less than a time ($t_1$) consumed to transmit the linking information of the broadcast signals (e.g., multiple broadcast signals), and when the remaining times other than the times ($t_1$, $t_2$) are about the same, a time consumed to output the first broadcast signal shown in FIG. 8B may be less than a time consumed to output the first broadcast signal shown in FIG. 8A.

FIGS. 9A and 9B are exemplary flowcharts illustrating the operations of the DAB receiver and the head unit according to lapse of time. FIG. 9A shows an exemplary case of the DAB receiver 210 and the head unit 230. While the speaker 300 of the audio device 200 outputs a first broadcast signal, a turn-off signal may be input. In response to the turn-off signal, the DAB receiver 210 may be configured to complete reception of the first DAB signal currently being received.

In response to the turn-off signal, the head unit 230 may be configured to terminate the operation for outputting the first broadcast signal via the speaker 300, and may be configured to store linking information (L) of a plurality of broadcast signals. The head unit 230 may be configured to store linking information of the plurality of broadcast signals shown in FIG. 7. Thereafter, the user may input the turn-on signal. In response to receiving the turn-on signal, the DAB receiver 210 may be configured to request linking information from the head unit 230, to allow the DAB receiver 210 to receive a broadcast signal for outputting the first broadcast signal upon receiving the linking information. Upon receiving the linking information request, the head unit 230 may be configured to transmit a plurality of broadcast linking information. In FIG. 9A, the head unit 230 may be configured to transmit linking information of the plurality of broadcast signals to the DAB receiver 210. In particular, a time consumed to transmit the linking information of the entire broadcast signals may be denoted by $t_1$.

When a plurality of broadcast linking information is completely transmitted, the DAB reception unit may be configured to reference linking information (L1) of the first broadcast signal. Accordingly, the DAB reception unit may be configured to receive the first DAB signal, or the FM reception unit may be configured to receive the first FM signal. It may be assumed that the operations shown in FIG. 9A are based on the reception case of the first DAB signal. After the DAB receiver 210 receives the first DAB signal, the DAB receiver 210 may be configured to transmit the first DAB signal to the head unit 230, to allow the head unit 230 to output the first broadcast signal.

Additionally, FIG. 9B exemplarily shows the case of using the DAB receiver 210 and the head unit 230 for use in the vehicle according to one exemplary embodiment. First, while the speaker 300 of the audio device 200 outputs the first broadcast signal, the user may input a turn-off signal. In response to the turn-off signal, the DAB receiver 210 may be configured to complete reception of the first DAB signal being currently received.

In response to the turn-off signal, the head unit 230 may be configured to complete the operation for outputting the first broadcast signal via the speaker 300, and may be configured to store linking information (L) of a plurality of broadcast signals. The head unit 230 may be configured to store linking information of the plurality of broadcast signals shown in FIG. 7. Thereafter, the user may input a turn-on signal. In response to the turn-on signal, the DAB receiver 210 may be configured to request linking information from the head unit 230 to allow the DAB receiver 210 to receive the linking information and output a broadcast signal for outputting the first broadcast signal.

Upon receiving the linking information request, the head unit 230 may be configured to transmit linking information (L1) of the first broadcast signal without transmitting the plurality of broadcast linking information. A time required for transmission of the linking information (L1) of the first broadcast signal may be denoted by $t_2$. After the linking information (L1) of the first broadcast signal is transmitted, the DAB reception unit may be configured to reference the linking information (L1) of the first broadcast signal. Accordingly, the DAB reception unit may be configured to receive the first DAB signal or the FM reception unit may be configured to receive the first FM signal. It may be assumed that the operations shown in FIG. 9B are based on the reception case of the first DAB signal.

Thereafter, the DAB reception unit may be configured to transmit an acknowledgement (ACK) signal that indicates the reception of the linking information (L1) of the first broadcast signal, and transmit the first DAB signal to the head unit 230. The head unit 230 may then be configured to output the first broadcast signal based on the first DAB signal, and begin to transmit linking information (Le) of the remaining broadcast signals other than the first broadcast signal in response to the acknowledgement (ACK) signal. A specific time consumed to transmit the linking information (Le) of the remaining broadcast signals may be denoted by $t_3$.

Compared to FIG. 9A, the specific time ($t_1$) of FIG. 9B may be about the same as the time ($t_2+t_3$), thus reducing a time consumed to output the first broadcast signal. In addition, when a second broadcast signal is selected when the head unit 230 transmits the linking information (Le) of the remaining broadcast signals other than the first broadcast signal, the controller may be configured to confirm whether the linking information of the second broadcast signal is transmitted.

Upon transmission of the linking information of the second broadcast signal, the head unit 230 may be configured to continuously the linking information (Le) of the remaining broadcast signals. Accordingly, the DAB receiver 210 may be configured to receive the second DAB signal based on the linking information of the second broadcast signal, or the FM receiver 220 may be configured to receive the second FM signal based on the linking information of the second broadcast signal.

Furthermore, in response to confirming that linking information of the second broadcast signal is not transmitted to the DAB receiver 210, the head unit 230 may first be configured to transmit the linking information of the second broadcast signal from among the remaining broadcast signals other than the first broadcast signal. The DAB receiver 210 may then be configured to confirm the linking information of the second broadcast signal before receiving the linking information of the entire broadcast signals.

FIG. 10 is an exemplary flowchart illustrating the operations activated when a turn-off signal is input to a vehicle according to one exemplary embodiment of a vehicle control method. Referring to FIG. 10, the controller may be configured to determine whether the turn-off signal of the audio device is input in step 700. When the turn-off signal is not input, the controller may be configured to continuously determine whether the turn-off signal is input. When the turn-off signal is input, the operation for outputting the first broadcast signal being currently output may be terminated in response to the turn-off signal in step 710. Finally, the linking information of the plurality of broadcast signals may be stored in the head unit in step 720. Specifically, the linking information of the outputtable broadcast signals (e.g., broadcast signal capable of being output) including the first broadcast signal output before the input time of the turn-off signal may be stored in the head unit 230.

Although FIG. 10 exemplarily shows the case in which the operation for completing outputting the first broadcast signal and the operation for storing linking information (L) of a plurality of broadcast signals are sequentially performed, it should be noted that the respective steps may be simultaneously performed and may also be performed in reverse order.

FIG. 11 is an exemplary flowchart illustrating the operations activated when the turn-on signal is input to a vehicle according to one exemplary embodiment of a vehicle control method. Referring to FIG. 11, the controller may be configured to determine whether the turn-on signal of the audio device is input in step 800. When the turn-on signal is not input, the controller may be configured to continuously determine whether the turn-on signal is input.

When the turn-on signal is input, the head unit may be configured to transmit linking information of the first broadcast signal to the DAB receiver in step 810. For this purpose, the head unit 230 may be configured to store linking information (L) of a plurality of broadcast signals including the first broadcast signal according to the method of FIG. 10. Thereafter, the controller may be configured to confirm whether the acknowledgement (ACK) signal that indicates that the linking information has been received from the DAB receiver is transmitted to the head unit in step 820. Prior to transmission of the ACK signal, the vehicle control method may include continuously determining transmission or non-transmission of the ACK signal.

When the ACK signal is transmitted to the head unit, the head unit may be configured to output the first broadcast signal via the speaker in step 830. In particular, the DAB receiver 210 may be configured to receive the first DAB signal, and determine whether the DAB signal is equal to or less than a threshold value. When the intensity of the first DAB signal is equal to or less than a threshold value, first FM frequency information may be confirmed using the linking information (L1) of the first broadcast signal. The FM receiver 220 may be configured to receive the first FM signal based on the confirmed first FM frequency information.

When the intensity of the first DAB signal is greater than the threshold value, the head unit 230 may be configured to perform post-processing of the first DAB signal, and provide the post-processed first DAB signal to the speaker 300. When the intensity of the first DAB signal is equal to or less than the threshold value, the head unit 230 may be configured to perform post-processing of the first FM signal, and provide the post-processed first FM signal to the speaker 300. The speaker 300 may then be configured to convert the received broadcast signal into audible sound, and thus output a first broadcast signal.

In addition, the vehicle control method may include outputting the first broadcast signal, and simultaneously may be prevented from transmitting (e.g., unable to transmit) linking information of the remaining broadcast signals other than the first broadcast signal in step 840. Accordingly, since a transmission time of the linking information is reduced, a delay time ranging from the turn-on time to an output time of the first broadcast signal may also be reduced. Although FIG. 11 exemplarily shows the case in which the operation for outputting the first broadcast signal and the operation for transmitting linking information (Le) of the remaining broadcast signals are performed simultaneously, it should be noted that the respective steps may also be sequentially achieved as necessary.

As is apparent from the above description, the vehicle and the method for controlling the same according to the exemplary embodiments may first transmit linking information of a broadcast signal desired to be output to the DAB receiver, to substantially reduce a time consumed for outputting audio broadcast signals. Accordingly, a user may more rapidly receive high-quality audio broadcasting within a reduced period of time from a turn-on time.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A vehicle, comprising:
   a Digital Audio Broadcasting (DAB) receiver configured to receive a first DAB signal that corresponds to a selected first broadcast signal;
   a speaker configured to output the first broadcast signal based on the received first DAB signal or a first frequency-modulation (FM) signal that corresponds to the first broadcast signal; and
   a head unit configured to transmit linking information of the first broadcast signal from among linking information of a plurality of broadcast signals to the DAB receiver in response to receiving a turn-on signal, to output the first broadcast signal been output during a turn-off mode.

2. The vehicle according to claim 1, wherein after receiving the linking information of the first broadcast signal from the head unit, the DAB receiver is configured to transmit an acknowledgement (ACK) signal to the head unit.

3. The vehicle according to claim 2, wherein after receiving the acknowledgement (ACK) signal from the DAB receiver, the head unit is configured to transmit linking information of the remaining broadcast signals other than the first broadcast signal to the DAB receiver.

4. The vehicle according to claim 3, wherein when a second broadcast signal is selected during transmission of the linking information of the remaining broadcast signals other than the first broadcast signal, the head unit is configured to determine transmission or non-transmission of linking information of the second broadcast signal.

5. The vehicle according to claim 4, wherein the head unit is configured to first transmit the linking information of the second broadcast signal from among the remaining broadcast signals other than the first broadcast signal, in response to determining that the linking information of the second broadcast signal is not transmitted to the DAB receiver.

6. The vehicle according to claim 1, wherein the linking information includes frequency-modulation (FM) frequency information for receiving an FM signal used to output a corresponding broadcast signal.

7. The vehicle according to claim 1, wherein when intensity of the received first DAB signal is equal to or less than a predetermined threshold value, the DAB receiver is configured to confirm a first FM frequency from the linking information of the first broadcast signal.

8. The vehicle according to claim 7, further comprising:
   a frequency-modulation (FM) receiver configured to receive the first FM signal that corresponds to the first broadcast signal using the confirmed first FM frequency.

9. The vehicle according to claim 8, wherein the head unit is configured to operate the speaker to output the first broadcast signal based on the first FM signal received by the FM receiver.

10. The vehicle according to claim 1, wherein the head unit includes a head unit storage unit configured to store linking information of the plurality of broadcast signals upon receiving a turn-off signal.

11. The vehicle according to claim 10, wherein the head unit storage unit is configured to store linking information of the plurality of broadcast signals including the first broadcast signal.

12. The vehicle according to claim 10, wherein the head unit further includes: a controller configured to transmit linking information of the first broadcast signal output during the turn-off mode from among the linking information of the plurality of broadcast signals stored in the head-unit storage unit to the DAB receiver, in response to receiving the turn-on signal.

13. A method for controlling a vehicle that includes a Digital Audio Broadcasting (DAB) receiver configured to receive a first DAB signal that corresponds to a selected first broadcast signal, the method comprising:
   terminating, by a head unit, an output of a first broadcast signal in response to receiving a turn off signal;
   transmitting, by the head unit, linking information of the first broadcast signal from among linking information of a plurality of broadcast signals to the DAB receiver in response to receiving a turn-on signal; and
   outputting, by the head unit, the first broadcast signal using the first DAB signal or a first frequency-modulation (FM) signal obtained based on the linking information of the first broadcast signal.

14. The method according to claim 13, further comprising:
   transmitting, by the DAB receiver, an acknowledgement (ACK) signal to the head unit in response to receiving the linking information of the first broadcast signal stored in a head unit storage unit.

15. The method according to claim 14, further comprising:
   transmitting, by the head unit, linking information of the remaining broadcast signals other than the first broadcast signal to the DAB receiver, in response to receiving the acknowledgment (ACK) signal.

16. The method according to claim 15, wherein the transmitting of the linking information of the remaining broadcast signals other than the first broadcast signal to the DAB receiver includes:
   when a second broadcast signal is selected while the linking information of the remaining broadcast signals other than the first broadcast signal is transmitted to the DAB receiver, determining, by the head unit, whether linking information of the second broadcast signal is transmitted to the DAB receiver.

17. The method according to claim 16, wherein the transmitting of the linking information of the remaining broadcast signals other than the first broadcast signal to the DAB receiver includes:
first transmitting, by the head unit, linking information of the second broadcast signal from among the remaining broadcast signals other than the first broadcast signal in response to determining that the linking information of the second broadcast signal is not transmitted to the DAB receiver.

18. The method according to claim 13, wherein the linking information includes frequency-modulation (FM) frequency information for receiving an FM signal used to output a corresponding broadcast signal.

19. The method according to claim 13, wherein the outputting of the first broadcast signal includes:
selecting, by the head unit, any one of the first DAB signal or the first FM signal in response to intensity of the first DAB signal.

20. The method according to claim 19, wherein the outputting of the first broadcast signal includes:
confirming, by the head unit, a first FM frequency based on the linking information of the first broadcast signal when the intensity of the received first DAB signal is equal to or less than a predetermined threshold value.

21. The method according to claim 20, wherein the outputting of the first broadcast signal further includes:
receiving, by the head unit, the first frequency-modulation (FM) signal that corresponds to the first broadcast signal using the confirmed first FM frequency.

22. The method according to claim 21, wherein the outputting of the first broadcast signal further includes:
outputting, by the head unit, the first broadcast signal based on the first FM frequency.

23. The method according to claim 13, further comprising:
storing, by the head unit, the linking information of the plurality of broadcast signals in a head unit storage unit in response to receiving the turn-off signal.

24. The method according to claim 23, wherein the storing of the linking information of the plurality of broadcast signals includes:
storing, by the head unit, linking information of the plurality of broadcast signals including the first broadcast signal in the head unit storage unit.

* * * * *